(12) United States Patent
Guerrina

(10) Patent No.: US 6,459,062 B1
(45) Date of Patent: Oct. 1, 2002

(54) APPARATUS AND METHOD FOR PRECISELY ALIGNING AND WELDING TWO PIECES OF WELDABLE MATERIAL

(76) Inventor: Michael Guerrina, 209 E. Ben White Blvd., Suite 116, Austin, TX (US) 78704

( * ) Notice: Subject to any disclaimer, the term of this patent is extended or adjusted under 35 U.S.C. 154(b) by 0 days.

(21) Appl. No.: 09/620,506

(22) Filed: Jul. 20, 2000

Related U.S. Application Data

(63) Continuation of application No. 08/878,394, filed on Jun. 18, 1998, now Pat. No. 6,121,567.

(51) Int. Cl.$^7$ .................................................. B23K 9/02
(52) U.S. Cl. .................................. 219/60 A; 219/125.11
(58) Field of Search ................................ 219/60 A, 61, 219/125.11

(56) References Cited

U.S. PATENT DOCUMENTS

| | | | | |
|---|---|---|---|---|
| 4,857,690 A | * | 8/1989 | Kazlauskas | ................ 219/60 A |
| 5,288,963 A | * | 2/1994 | Jusionis | .................... 219/60 A |
| 5,841,089 A | * | 11/1998 | Martinenas | ............... 219/60 A |
| 6,121,567 A | * | 9/2000 | Guerrina | .................... 219/60 A |

* cited by examiner

Primary Examiner—Clifford C. Shaw
(74) Attorney, Agent, or Firm—David G. Henry

(57) ABSTRACT

Applicant's invention includes an apparatus and associated method for precisely aligning two pieces of weldable material and welding the two pieces, the apparatus contains means for independently securing the two pieces of weldable material and for centering the junction of the two pieces in line with the welding electrodes.

1 Claim, 13 Drawing Sheets

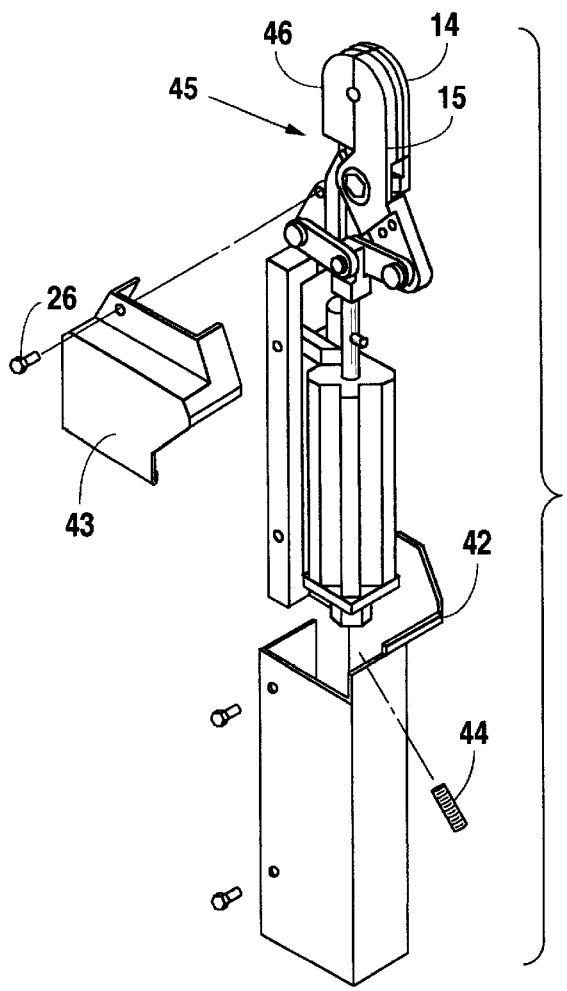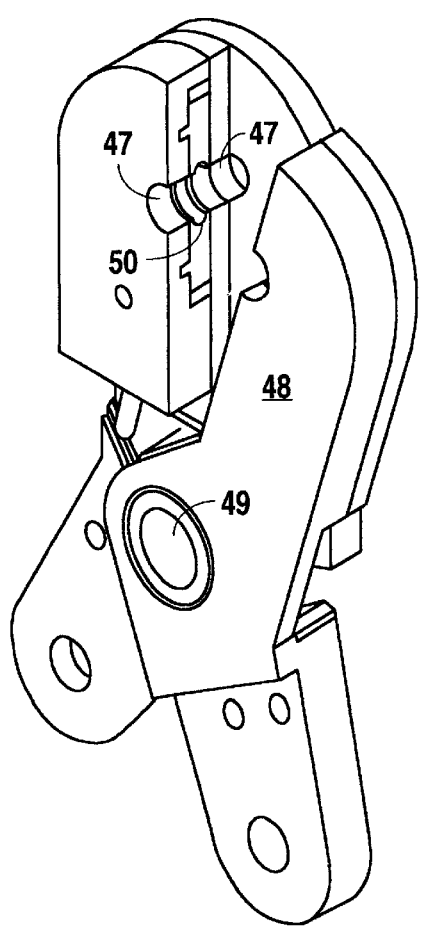

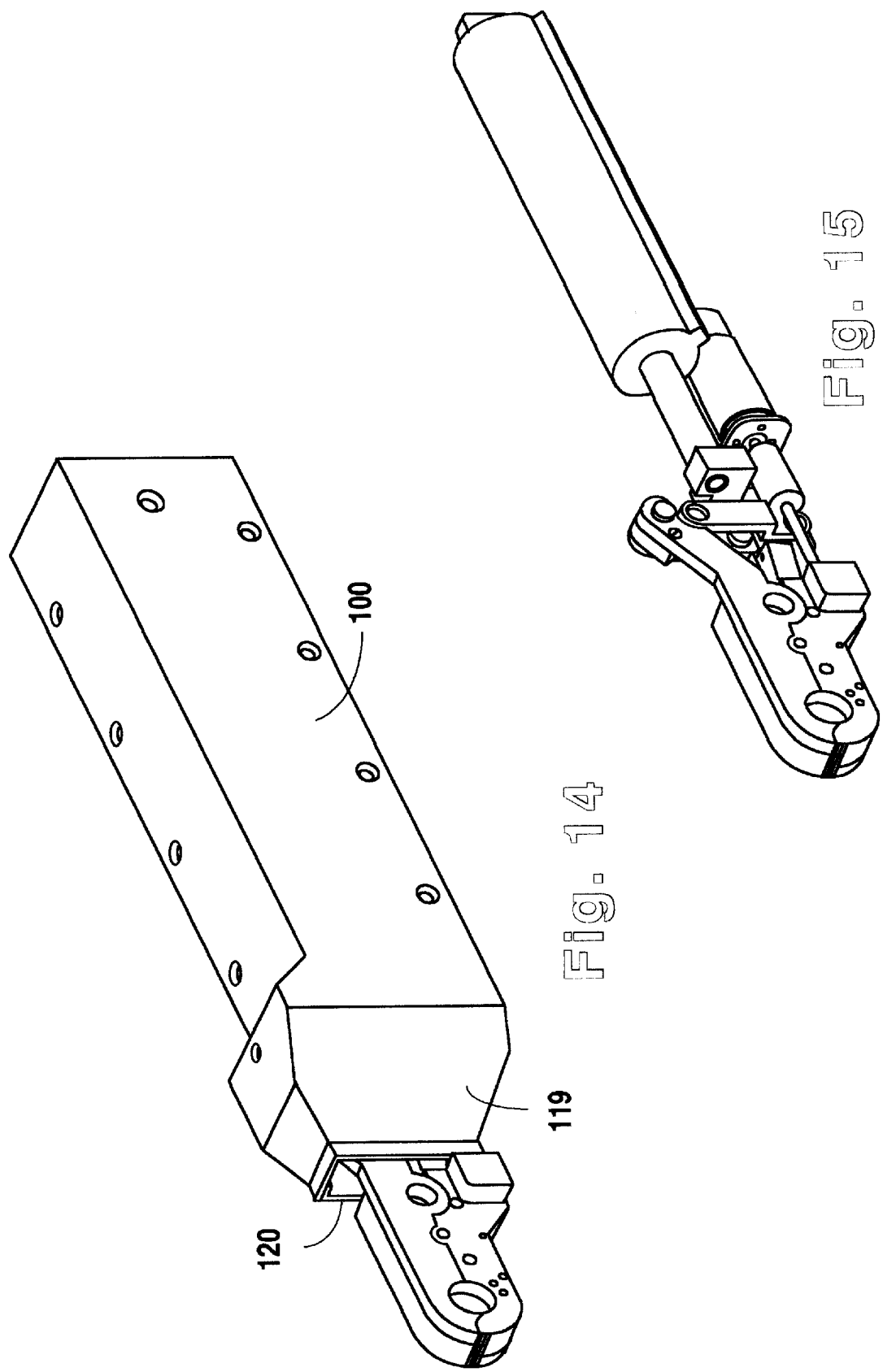

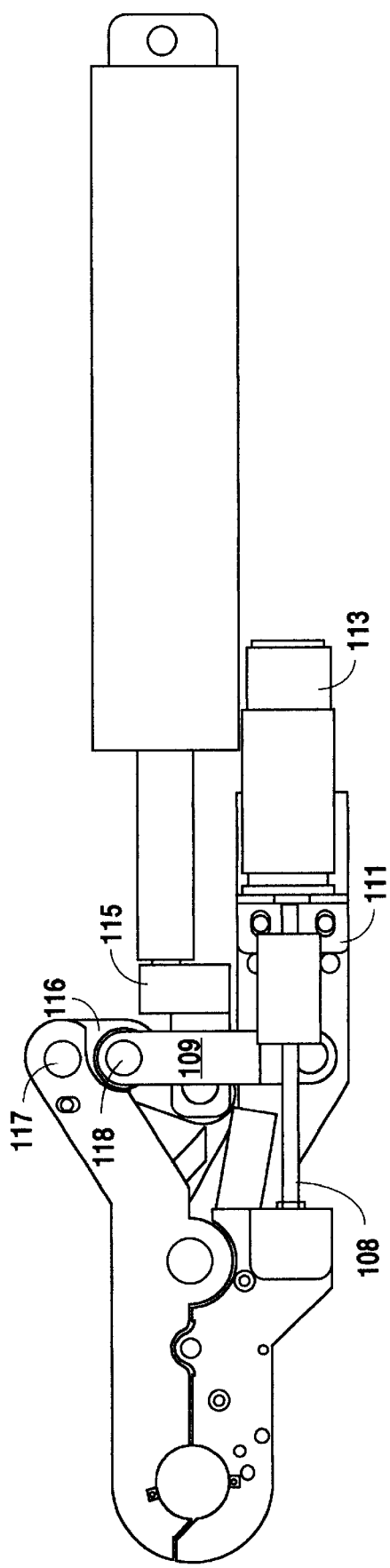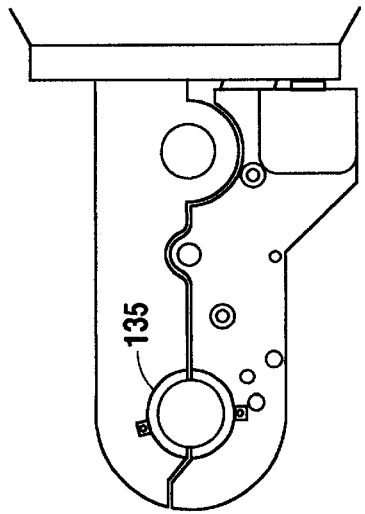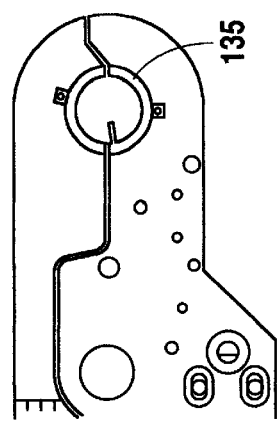

APPARATUS AND METHOD FOR PRECISELY ALIGNING AND WELDING TWO PIECES OF WELDABLE MATERIAL

CITATION TO PRIORITY APPLICATION

This patent application is a continuation application of U.S. patent application Ser. No. 08/878,394, filed Jun. 18, 1998, now U.S. Pat. No. 6,121,567 from which priority is claimed.

FIELD OF THE INVENTION

Applicant's invention relates to the joining together of two pieces of material by welding.

BACKGROUND INFORMATION

Welding is a well-known and widely-used method used to permanently join together two pieces of metal tubing or other weldable material. To accomplish a weld of high integrity, the two pieces to be joined together must be properly aligned.

Misalignment during welding creates discontinuities at the abutment junction of the two pieces of weldable material that can serve as havens for particle impurities. The existence of these particle "sites" is intolerable when the welding is being performed in connection with ultra-pure applications such as are common in the semiconductor industry. Moreover, misalignment can result in a leaky junction that destroys the purity of the substance flowing through the tubing and creates a potentially dangerous external environment if the substance flowing through the tubing is toxic. Thus, it is highly desirable to minimize tube misalignment when welding.

Maintaining proper alignment during the conventional welding process, however, is a time-consuming and difficult task. The pieces of weldable material to be aligned and welded must be clamped tightly in alignment before and during the welding process, or the pieces will tend to slip out of alignment before the weld is completed.

Conventional orbital weld heads do not solve this slippage problem. In an orbital welding machine, a computer-controlled welding machine works in conjunction with a weld head that also holds the two pieces of weldable material together during the welding process. The weld head is essentially comprised of a system of gears and an electrode for making the weld. The gears control the movement of the electrode as it "orbits" around the circumference of the junction between the two pieces of weldable material. Orbital welding is in great demand, especially for welding of tubing of small circumference, because of the ease in which the welding process can be controlled. Orbital welding however, does not solve the problem of misalignment.

To the contrary, the conventional weld head on a standard orbital welder has such little clamping surface area that proper alignment of the pieces of weldable material is often the most significant and time-consuming challenge facing the technician operating the welder. For example, welding is often performed on pieces of weldable material that are many feet in length and that may have hardware or other accessories permanently attached thereto. Because the weld head in conventional welding is typically affixed to a table or bench, the technician is sometimes required to place one end of a weldable material piece upon support blocks so that the weight of the weldable material and any attached hardware does not drag the weldable material out of alignment.

In addition, because of the construction of the conventional orbital weld head, the technician has an extremely limited view of the junction to be welded as he attempts to align the two pieces of weldable material to each other and position the junction of the two pieces in line with the electrode. To aid in the alignment procedure, the technician may use a "feeler" gauge such as a small screwdriver. The feeler gauge is moved by the technician over the top or side of the abutment junction, allowing the technician to determine which of the two pieces of weldable material needs to be moved to improve the alignment. Even after achieving acceptable alignment of the pieces to be welded together, the technician is also required to position the tube junction to be welded in line with the electrode, to ensure a proper weld. The manual performance of these tasks is far from ideal for applications requiring strict alignment and is very time-consuming.

Even if the technician is able to obtain satisfactory alignment at the start of the conventional orbital welding process, the weldable material pieces will tend to separate during the welding process, because hot spots created by the rotating electrode expand to different degrees, thereby creating a twisting effect as the electrode continues its rotation around the abutment junction. An attempt to excessively tighten the clamps on the weld head to overcome this problem usually results in the formation of clamping marks in the weldable material and may result in actual tube deformation.

In an attempt to solve the problem of alignment and the "twisting effect" described above, skilled welders commonly align the two pieces of weldable material and make several temporary spot welds or "tack" welds around the circumference of the abatement junction prior to final welding. Tack welds join the two pieces of weldable material together and are sufficiently strong to prevent the separation and twisting effect described above. During final welding, the tack welds merely are re-melted into the final weld.

Even when using tack welding, proper alignment is critical, and therefore, tack welding, by itself, does not address the problem of creating acceptable alignment in a time efficient manner. Although tack welding effectively joins two pieces together prior to performing an orbital weld and makes the orbital welding process much simpler, throughput or productivity, measured in welds per hour, is still limited by the amount of time it takes to align the pieces in preparation for the tack weld.

Applicant's prior invention, which is the subject of patent application Ser. No. 08/318,385, now U.S. Pat. No. 5,679,271 has addressed this alignment problem by teaching the use of a device which allows two pieces of weldable material to be precisely aligned and tack welded together. Although Applicant's prior invention is a definite improvement over the prior art, it still is not an ideal solution, because once the tack weld is completed, the technician must then spend time switching instruments to perform a full weld with a conventional orbital weld head.

The present invention expands and improves upon the concept taught by Applicant's prior invention, by teaching the use of a device that causes two pieces of weldable material to be precisely aligned and completely welded together, thereby eliminating the steps of tack welding and then switching instruments to perform a complete weld.

Thus, the present invention, by mechanizing the aligning task, has all of the benefits of a conventional orbital welder, but greatly reduces the time required to achieve tolerable alignment and eliminates the separation, twisting, and clamp mark problems associated with the use of a conventional orbital welder.

SUMMARY OF THE INVENTION

It is an objective of this invention to provide a device and method of operation for said device for aligning and welding together two pieces of weldable material.

BRIEF DESCRIPTION OF THE DRAWINGS

Applicant's invention may be further understood from a description of the accompanying drawings wherein, unless otherwise specified, like reference numbers are intended to depict like components in the various views.

FIG. 1 through FIG. 13 depict one embodiment of this invention while FIG. 14 through FIG. 22 depict an alternative embodiment of this invention.

FIG. 1 is a perspective view of the alignment/welding device in the closed position;

FIG. 2 is an exploded view showing the arrangement of the various components that comprise a preferred embodiment of the alignment/welding device;

FIG. 3 is a perspective view of the alignment/welding device showing the device being closed from a fully open position to a partially closed first position, wherein the pre-lock clamping jaw is biased against the first jaw;

FIG. 4 is a partial cut-away view of a portion of the alignment/welding device in the closed position with weldable material present;

FIG. 5 is a depiction of the distance "d1" which is used to measure alignment tolerances.

FIG. 6 is an exploded view of the electrode/rotating gear assembly of the alignment/welding device;

FIG. 7 is a perspective view of a portion of the alignment/welding device, illustrating the manner in which the electrodes are wired.

FIG. 8 is a cut-away view of a portion of the alignment/welding device with a piece of weldable material in place, illustrating the manner in which the rotating gear assembly is arranged.

FIG. 9 is a cross-sectional view of the top portion of the alignment/welding device that holds the weldable pieces of material when such alignment/welding device is in the fully open position.

FIG. 10 is a cross-sectional view of the top portion of the alignment/welding device that holds the weldable pieces of material, when the first piece of weldable material has been inserted into the alignment/welding device and the alignment/welding device is closed to a partially closed first position, securely clamping the first piece of weldable material.

FIG. 11 is a cross-sectional view of a portion of the alignment/welding device that holds the weldable pieces of material, when the second piece of weldable material has been inserted into the alignment/welding device to abut against the first piece of weldable material, and the alignment/welding device is closed to a fully closed, second position, securely clamping the second piece of weldable material.

FIG. 12 is a cross-sectional view of a portion of the alignment/welding device that holds the weldable pieces of material, after the two pieces of weldable material are securely clamped in place and the rotating gear assembly begins rotating the arcing electrodes around the abutment junction of the two pieces of weldable material, thereby welding the junction.

FIG. 13 is a cross-sectional view of a portion of the alignment/welding service that holds the weldable pieces of material, after the two pieces of weldable material have been welded together at the abutment junction and the alignment/welding device has been returned to a fully open position.

FIG. 14 through FIG. 21 depict an alternative embodiment of the alignment/welding device;

FIG. 14 is a perspective view of the alignment/welding device enclosed in its housing elements with the top jaws and bottom jaws in a closed position without the weldable pieces present;

FIG. 15 is a perspective view of the alignment/welding device with the housing elements removed exposing the motor assembly which drives the orbital welder gear assembly and the pneumatic system which controls the closing and opening of the clamping jaw system.

FIG. 16 is a partial cut-away view of the alignment/welding device, depicting the top clamping jaws and the bottom clamping jaws, and the spring rod which advances the top jaw 103;

FIG. 17 is a partial cut-away view of the alignment/welding device, depicting a miniature pneumatic piston which controls the centering pin 136. The centering pin provides the means to ensure that the abutment junction of the two weldable pieces are properly aligned respect to the orbital welding mechanism. FIG. 17 also depicts the conducting strip which provides electric current path from a outside electric power supply to the orbital weld gear;

FIG. 18 is an exploded view showing the components that make up the one-piece orbital weld gear and the bearings against which the orbital weld gear glides during welding operation. The bearing assembly is pressed onto the bottom clamping jaw 101.

FIG. 19 is a partial cut-away view of the alignment/welding device, showing the drive gear assembly which rotates the orbital meld gear during the welding operation, and the plunger type switch situated on the top clamping jaws. The switches detect the presence of the weldable material when the jaws are in a close position.

FIG. 20 is a partial cut-away view of the alignment/welding device, depicting the motoring assembly that drives the gear assembly which rotates the orbital weld gear, and the pneumatic cylinder which provides the linear movement necessary for the clamping operation of the top jaws;

FIG. 21 depicts the collet inserts with which the alignment/welding device can be adopted to align and weld multiple sizes of tube.

DETAILED DESCRIPTION OF THE PREFERRED EMBODIMENT

Figure 2:
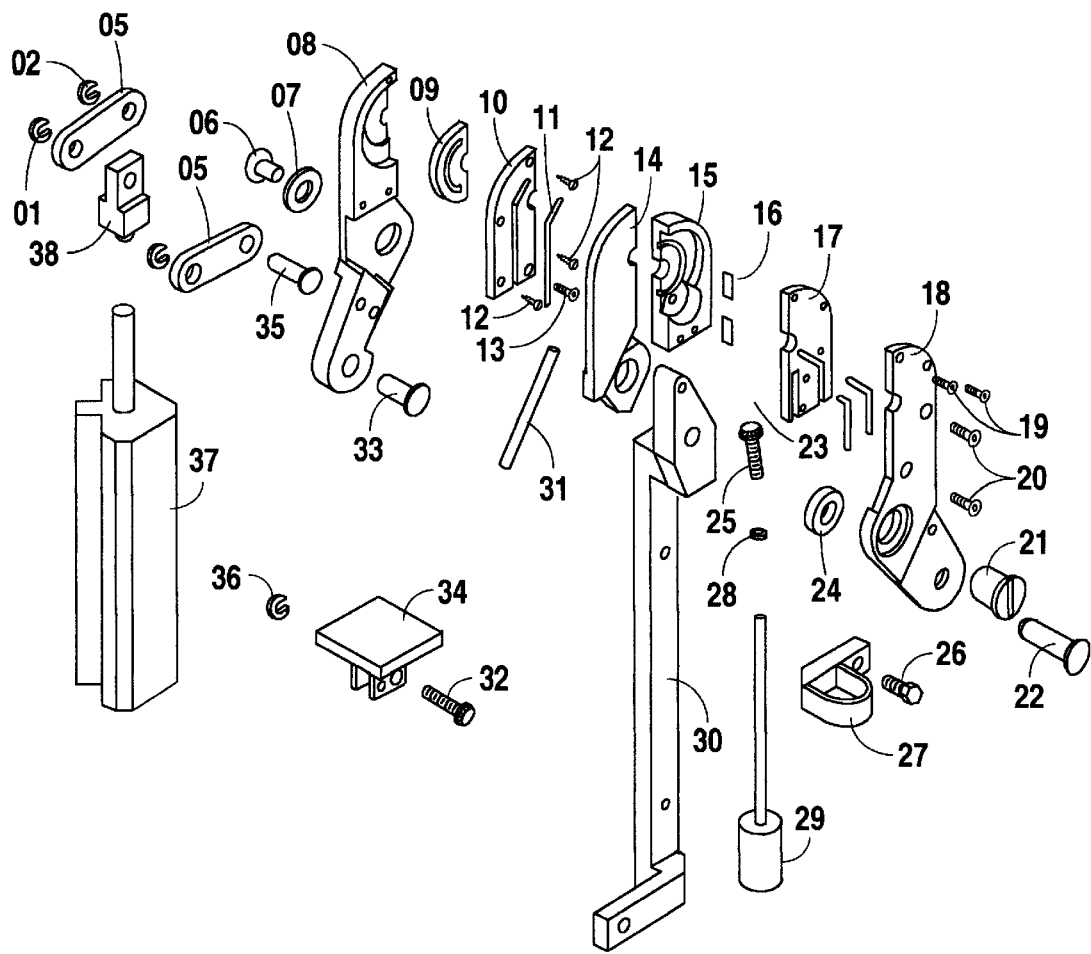
Figure 4:
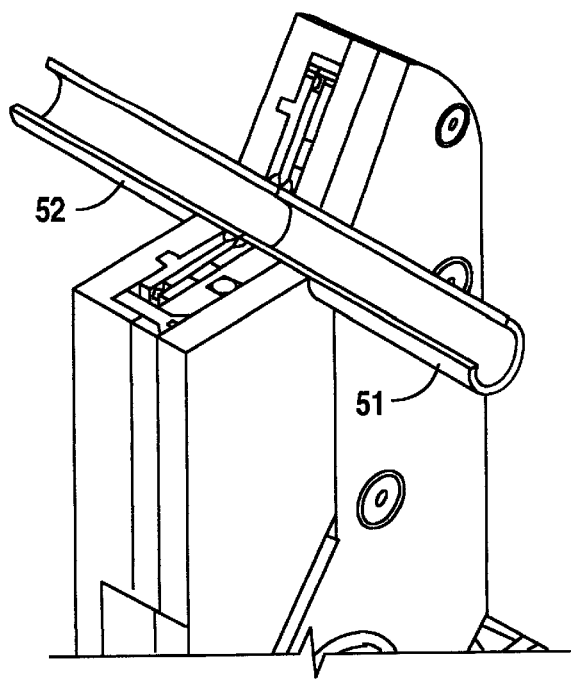

In the first embodiment of the invention, referring to FIG. 1 and FIG. 3, alignment/welding device 45 preferably has a first jaw 46, a second jaw 08 and a pre-lock clamping jaw 14. The first jaw 46 has a substantially semi-cylindrical gap which forms a first alignment zone 47. The second jaw 08 also has a substantially semi-cylindrical gap which forms a second alignment zone 48. The pre-lock clamping jaw 14 also has a substantially semi-cylindrical gap which forms a third alignment zone 50.

The first jaw 45 and second jaw 08 are pivotally joined together in a conventional pivot fashion, as commonly found in pliers or other similar hand tools, by using a pivot pin, bolt or similar component 49. The pre-lock clamping jaw 14 is mounted on the pivot pin 49 alongside the second jaw 08. As illustrated in FIG. 3 and as discussed below, when pivotally joined together and placed in the partially closed first position, the first jaw 46 aligns with and abuts against the pre-lock clamping jaw 14, in such a manner that the first alignment zone 47, and the third alignment zone 50 form a substantially cylindrical first section of an alignment conduit.

When the device is place in the fully closed second position, the first jaw 46 also is aligned with and abuts against the second jaw in such a manner that the first alignment zone 47 and the second alignment zone 48 form a substantially cylindrical second section of the alignment conduit which is substantially the same diameter as and contiguous with, the first section of the alignment conduit.

The diameter of the first section and second section of the alignment conduit preferably are substantially equal to the diameter of the pieces of weldable material to be welded together.

Referring to FIG. 2, tension rod 31 connects the pre-lock clamping jaw 14 to the second jaw 08 and pivotally advances pre-lock clamping jaw 14 so that the pre-lock clamping jaw 14 leads the second jaw 08 when the device is being closed, as shown in FIG. 3. The device 45 is closed to a first position by actuating a double acting/single rod pneumatic cylinder 37 (FIG. 2) or similar device. In place of a pneumatic cylinder, other well-known methods for closing the device can be used, such as a ratcheting gear or even manual pressure applied by the technician.

In this partially-closed first position, the pre-lock clamping jaw 14 abuts against the first jaw 46 as illustrated in FIG. 3 and the first section of the alignment conduit is formed. As device 45 is fully closed to the second/final position, the second jaw also abuts against the first jaw and the second section of the alignment conduit is formed. In the fully closed second position, the second jaw 8 and the pre-lock clamping jaw 14 are firmly positioned against the first jaw 46.

This mechanism allows a first piece of weldable material 51 and a second weldable material piece 52 to be secured into device 45 independently of one another.

Figure 6:
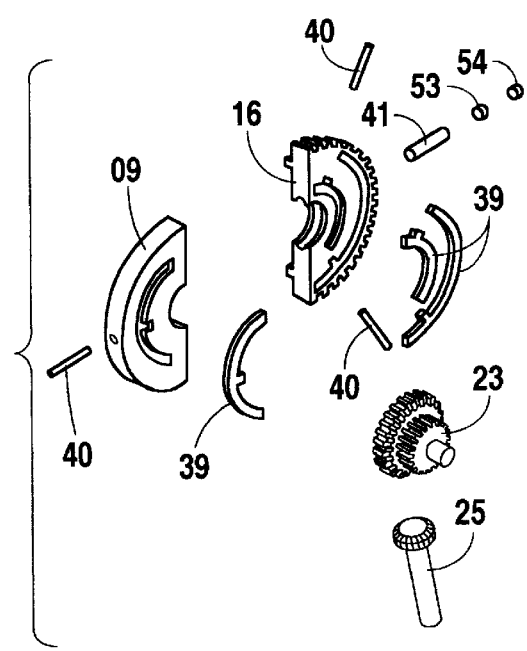
Figure 6A:
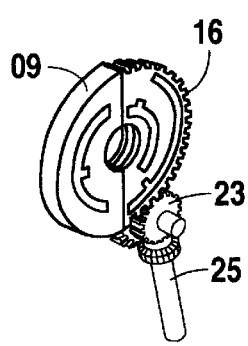
Figure 9:
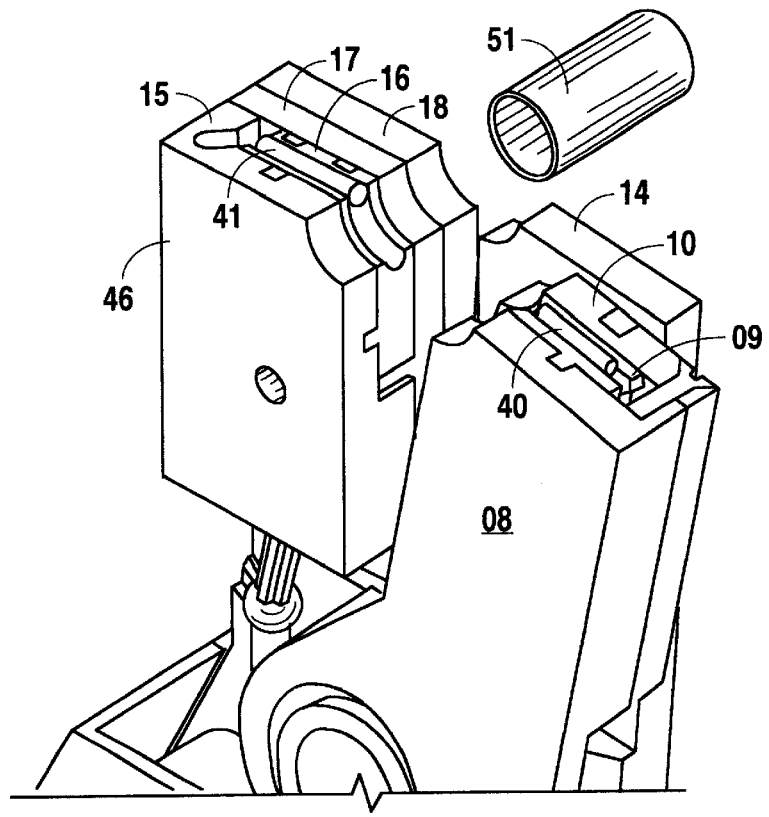

The manner in which the device 45 is used to align and weld two pieces of weldable material is best demonstrated by referring to FIGS. 9–12. As illustrated in FIG. 9, the technician places the first piece of weldable material 51 between the first jaw 46 and pre-lock clamping jaw 14, abutting against the retractable centering pin 41, located in the first jaw. As shown in FIG. 6, the centering pin is preferably spring-loaded and adjusted with a set screw. The centering pin is positioned such that it extends into the alignment conduit and is in the same plane of spatial orientation as the plurality of electrodes which also extend into the alignment conduit 47. The purpose of the centering pin is to center the abutment junction of the two pieces of weldable material directly in line with the electrodes and, therefore, any mechanism that would serve this purpose, would suffice.

Figure 10:
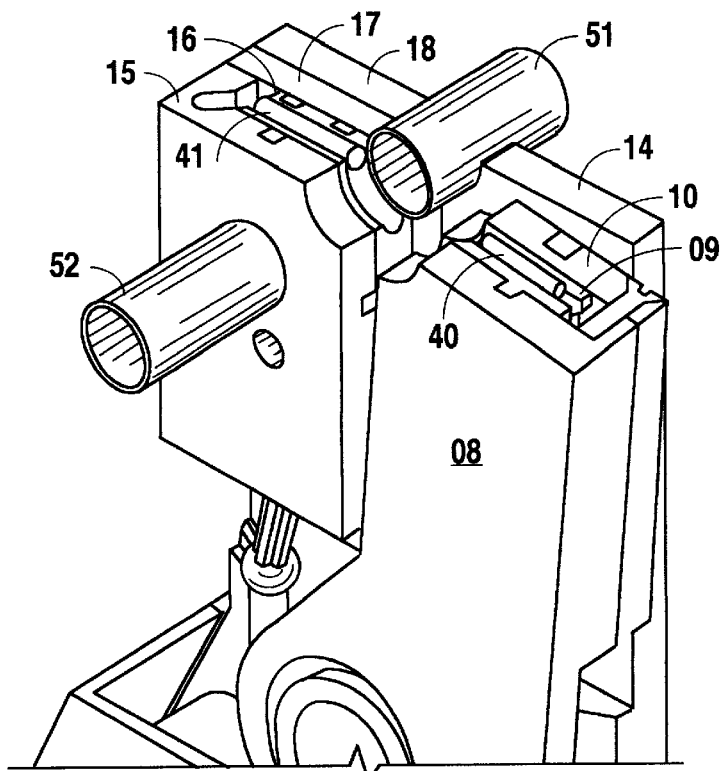
Figure 11:
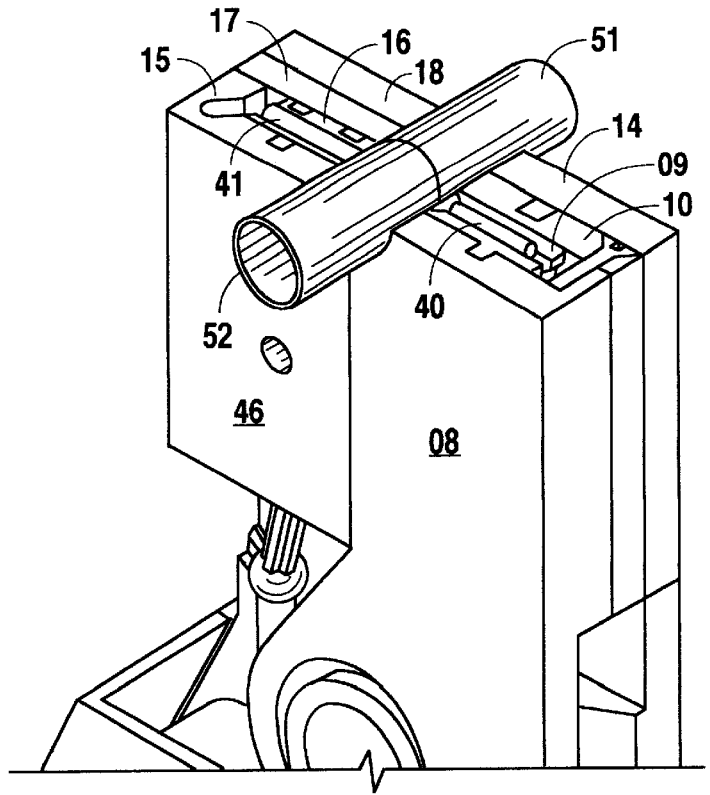

As illustrated in FIG. 10, as the device 45 is closed to the partially-closed first position, the pre-lock clamping jaw 14 makes contact with the first jaw 46, thereby firmly securing the first weldable material piece 51 in the first section of the alignment conduit, with the first terminus of the first piece of weldable material being located in the same plane of spatial orientation as the electrodes 40. As illustrated in FIG. 10 and FIG. 11, the technician then places the second piece of weldable material 52 between the first jaw 46 and second jaw 08, with the terminus of said second piece abutting the first terminus of the first weldable material piece 51. This action will cause the centering pin 41 to be depressed. In this manner, the two pieces of weldable material will contact each other and form an abutment junction in substantially the same plane of spatial orientation as the electrodes 40 surrounding the alignment conduit. By actuating the pneumatic cylinder 37 to the second/final position, the second jaw 08 contacts the first jaw 46 and firmly secures the second piece of weldable material 52 within the second alignment conduit.

Figure 5:
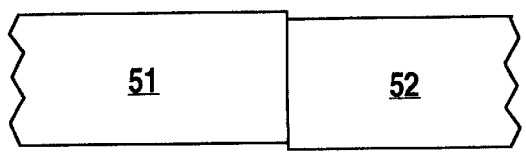
Figure 5A:
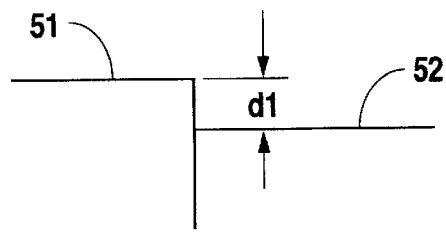

Because the first section and second section of the alignment conduit are substantially the same diameter and are substantially contiguous when device 45 is in the fully closed position, the first weldable material piece 51 and the second weldable material piece 52 will be in strict alignment with each other. Alignment tolerances of 10% or better can be achieved by the device 45 where the alignment tolerance equals the distance by which the weldable material pieces deviate from perfect alignment, divided by the diameter of the weldable material pieces. The distance by which the weldable material pieces deviate from perfect alignment is shown as "d1" in FIG. 5 and is measured at the largest exposed edge of first weldable material piece 51 at the junction with second weldable material piece 52.

When the device 45 is in a fully closed position, the first weldable material piece 51 and the second weldable material piece 52 are in place and the junction of these two pieces are in substantially the same plane of spatial orientation as the electrodes 40. Furthermore, the first weldable material piece 51 and the second weldable material piece 52 are in alignment with each other. With the first weldable material piece 51 and the second weldable material piece 52 thus securely clamped into place, device 45 can now be used for the weld process.

Figure 7:
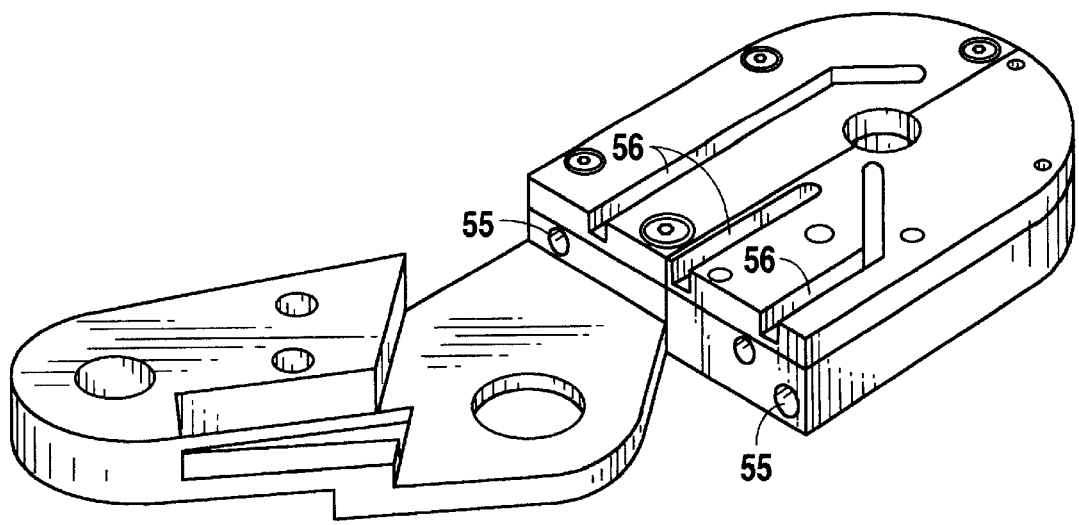
Figure 8:
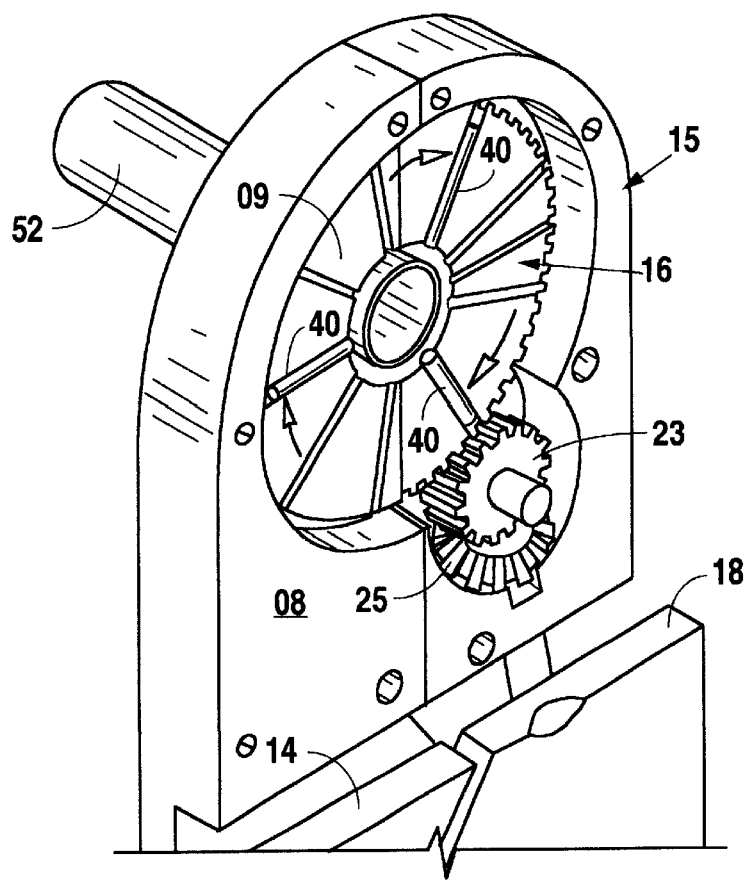
Figure 12:
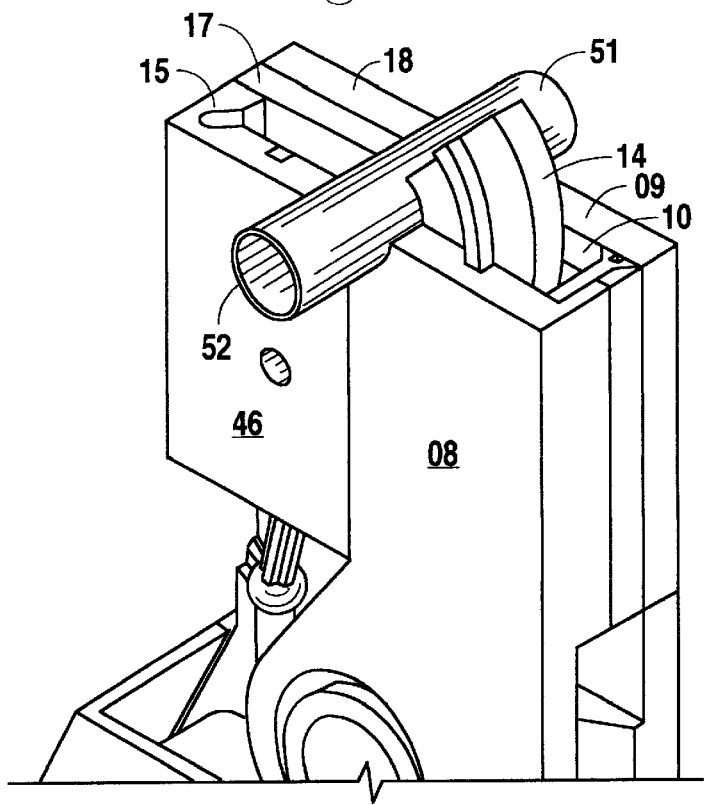
Figure 13:
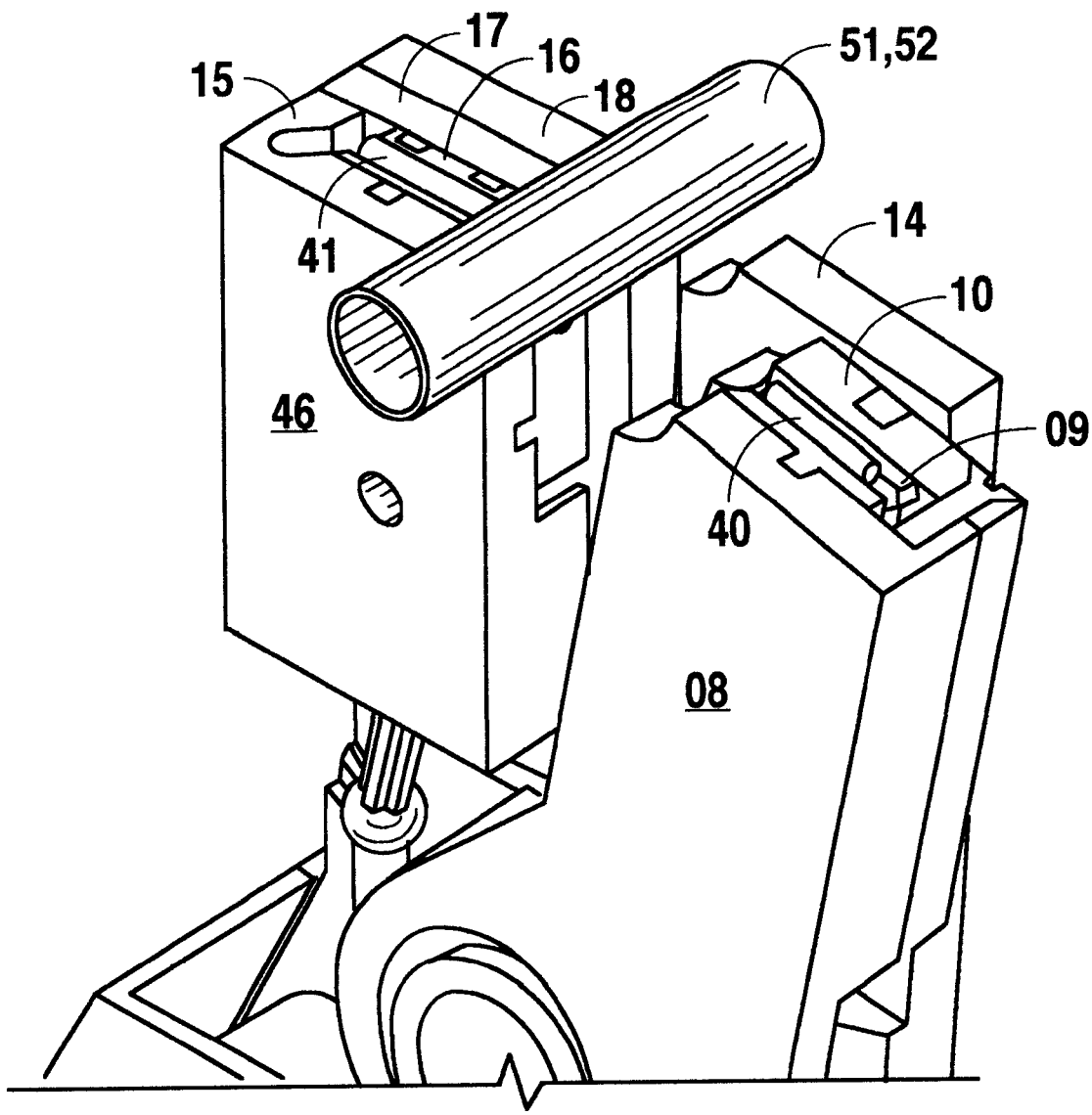

Referring to FIG. 7, argon gas from an external source (not shown) will flow into purge lines 55 via an external hose (not shown). The weld process is then initiated by depressing switch 44 which is depicted in FIG. 1. Referring to FIG. 6 and FIG. 8, the external welder (not shown) will supply an electric charge via wires 56 (FIG. 7) to the contacts 39 which will then cause electrodes 40 to arc to the abutment junction, thereby beginning the weld. An electric motor 29 or similar device then rotates u-joint 28, which, in turn, rotates the primary drive gear 25. As shown in FIG. 6 and FIG. 8, the primary drive gear 25 then rotates the secondary drive gear 23, thereby rotating insulating gears 09 and 16 a total of approximately 130 degrees. As illustrated in FIG. 12, the rotation of the insulating gears 09 and 16 allows the electrodes 40 to revolve around the abutment junction, thereby creating a complete weld of the abutment junction. After the weld process is complete, pressure is applied to the return side of the pneumatic cylinder 37 (FIG. 1), thereby releasing the pre-lock clamping jaw 14 and second jaw and allowing the fused weldable material piece to be removed from the device 45 as illustrated in FIG. 13.

The alternative embodiment as depicted in FIG. 14 further improves upon the first embodiment in several aspects.

First, the clamping jaws in the alternative embodiment are designed in such a way that a collet of highly precise dimension fits securely into the clamping jaws for gripping the weldable material during the welding operation. The precision collet not only grips the weldable material more securely but also significantly enhances the precision of alignment of the two pieces of weldable material. In addition, the easily interchangeable collet can be made of different inner sizes and dimensions to accommodate various weldable material of different outer dimensions and therefore significantly enhances the versatility of the alignment/welding device.

Second, the alternative arrangement of the driving gear assembly and the forty-five degree bearings packed next to the one-piece welding gear substantially reduced the outer dimension of the welding head assembly of the alignment/welding device. The small welding head allows the welding operation in very tight spaces. This is highly desirable in situations often found in typical semiconductor manufacturing facilities where the welding must be performed on one of many tubings closely spaced.

Referring to FIG. 14, the alignment/welding device 100 is shown in its enclosed form, housed in cover 119 and 120. In FIG. 15, the cover pieces 119 and 120 are removed, showing the pneumatic cylinder and the linkage assembly that bias the top clamping jaws 103 and 104 (see FIG. 16), also shown in FIG. 15 is the motor assembly that drives the gear assembly that rotates the one-piece weld gear.

Figure 16A:
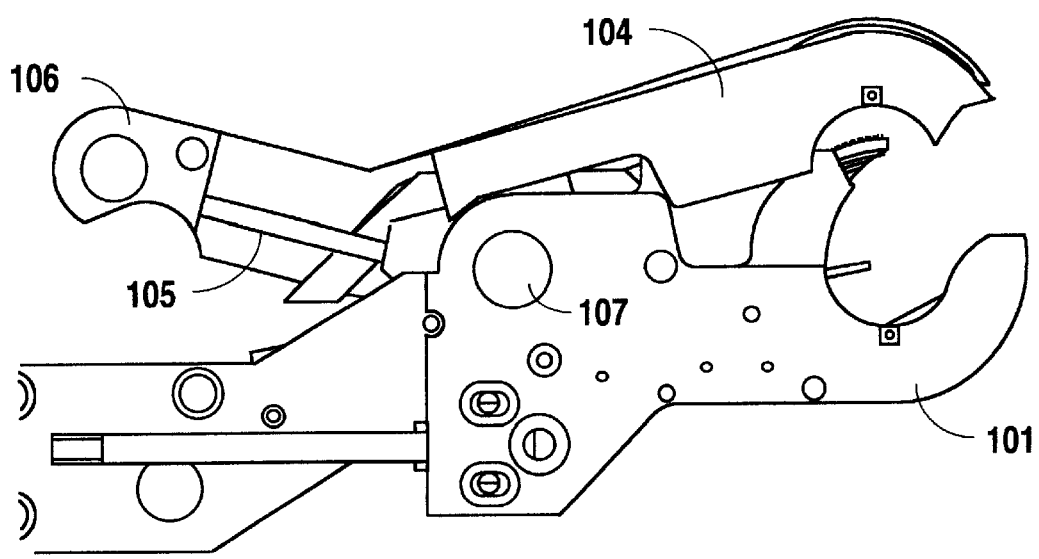
Figure 16B:
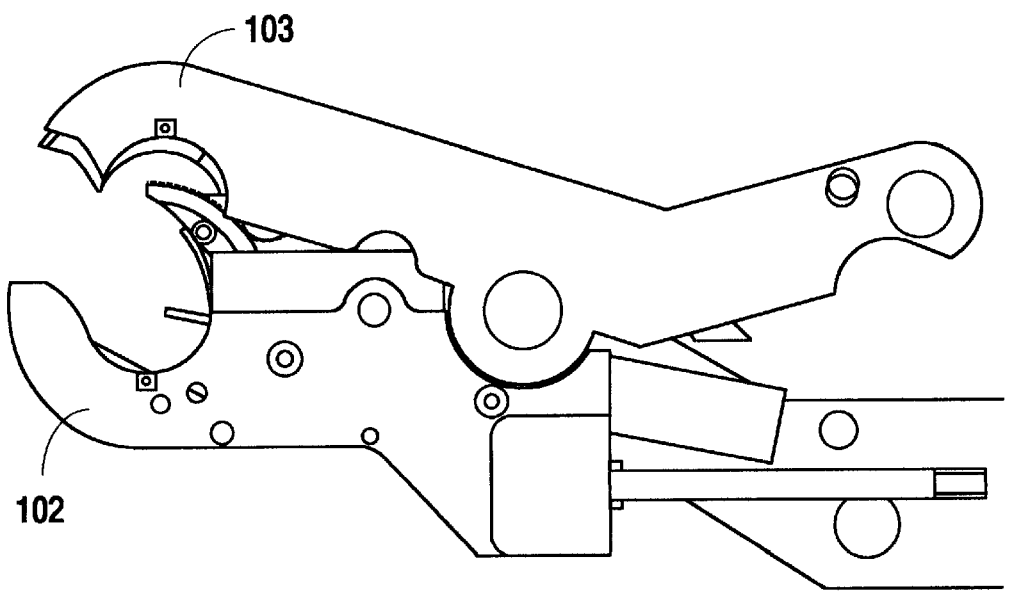

In this embodiment, the alignment/welding device is comprised of four clamping jaws pivot by a pivot element 107, as shown in FIG. 16. At the bottom, jaw 102 acts as a cover for the bottom jaw 101 and also provides one of four clamping jaw surfaces. At the top, a clamping jaw 102, corresponding to the pre-lock clamping jaw 14 in the first mode of embodiment, is advanced with respect to top clamping jaw 104 by a spring rod 105. The tension of the spring rod 105 can be adjusted through an adjustment block 106 that is attached to a top clamping jaw 101. Pivot element 107 functions similarly to the pivot pin 49 in the first mode of embodiment.

Figure 17A:
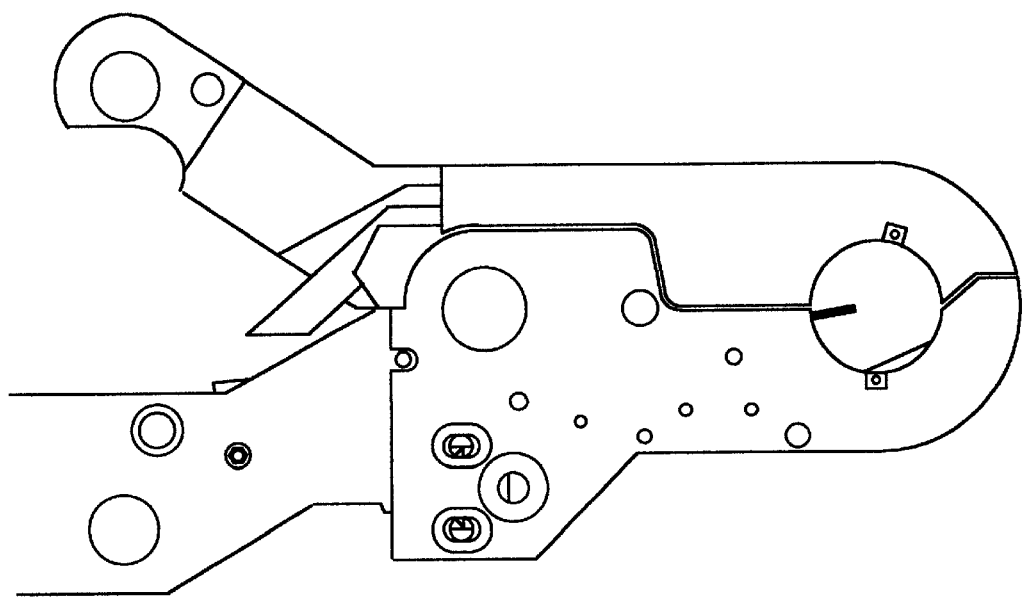
Figure 17B:
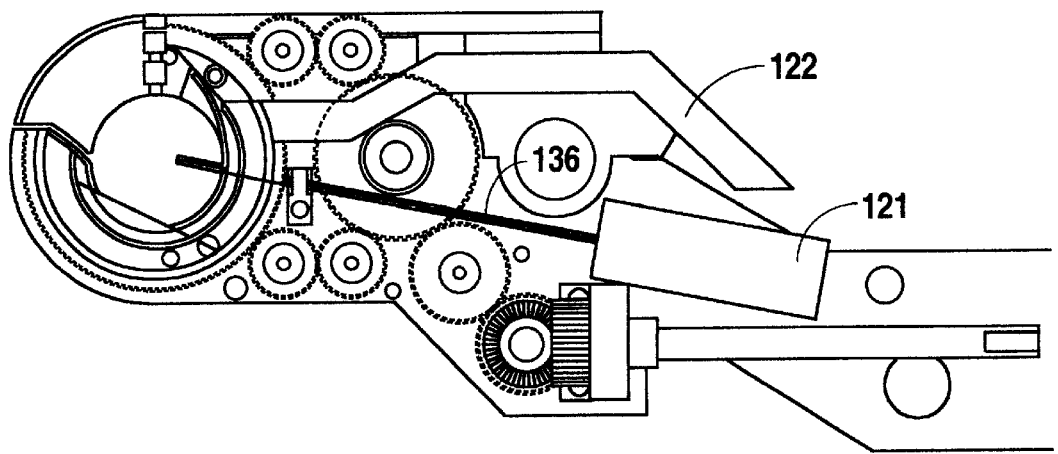

In this embodiment, the welding is performed with a one-piece weld gear 129, as in FIG. 17, which holds the tungsten welding electrodes 130. The one-piece weld gear is made of ceramic material. The weld gear may be made of conventional metallic material but insulation coating would be necessary. Ceramic provides not only excellent electrical insulation necessary for the welding operation but also provides excellent heat resistance.

Figure 18A:
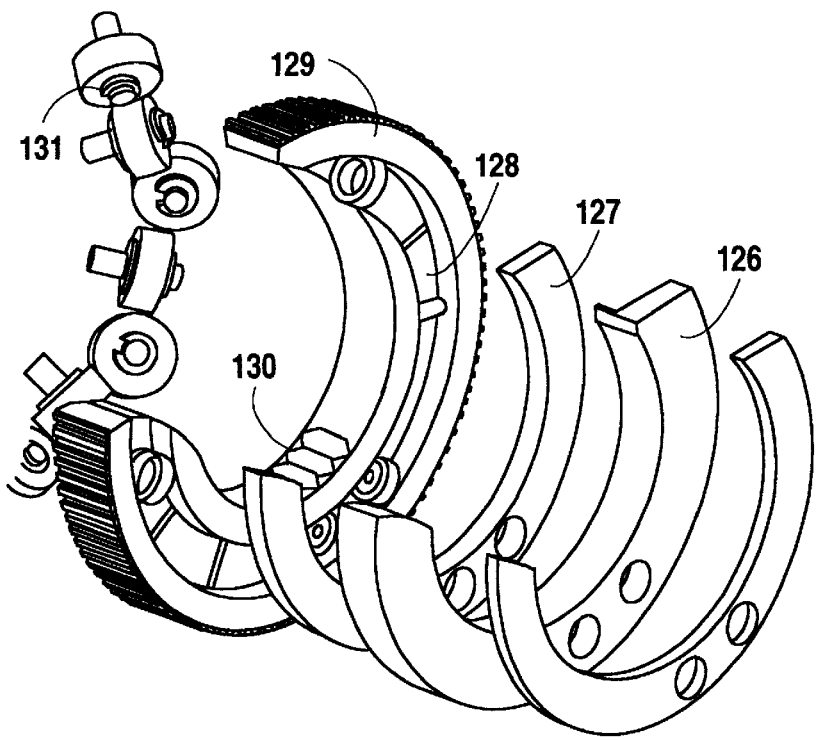
Figure 18B:
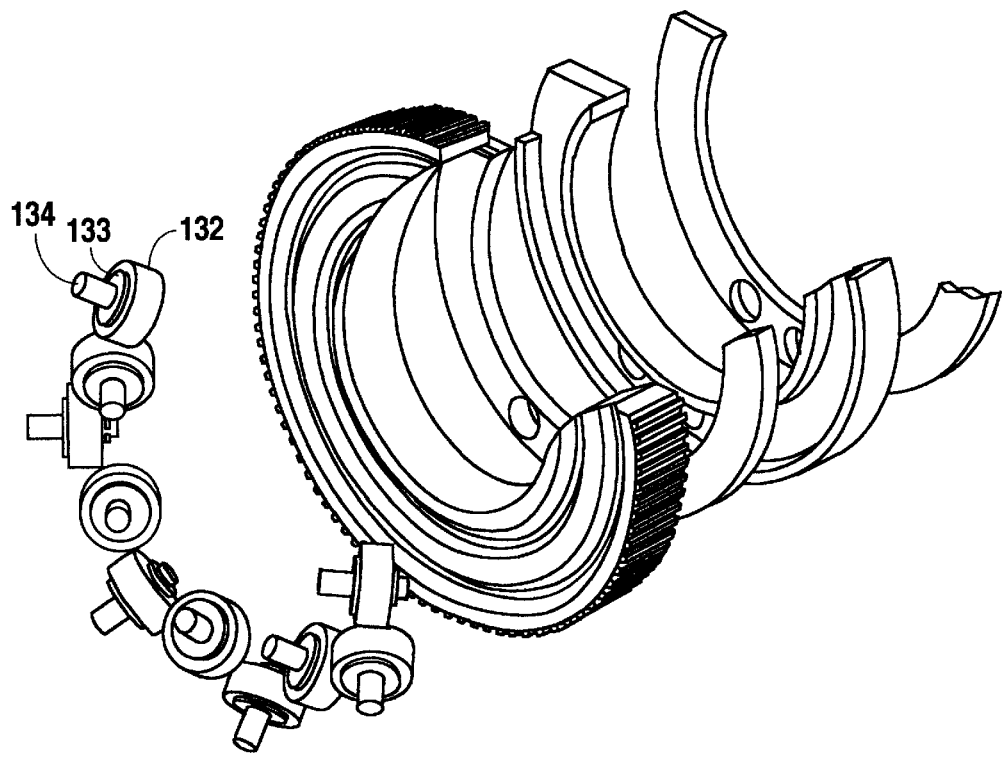

The electric current path is provided to the tungsten electrodes 130 through an electric strip element 128, as shown in FIG. 18, which is secured to the ceramic weld gear 129. Element 128 makes electrical contact with a strip element 127 which is connected to an outside electrical power supply (not shown) through a conductive strip element 122 as shown in FIG. 17. Conductive strip 127 is insulated from the clamping body by a ceramic insulator spacer element 126. The one-piece weld gear is complete with a wavy washer element 123 in FIG. 18. The wavy washer element 123 provides spring pressure to the ceramic insulator spacer element 126.

The clamping operation is a two-step process, similar to the first embodiment. As shown in FIG. 20, a pneumatic cylinder 114 drives the top clamping jaws 103 and 104. This pneumatic cylinder 114 has a three-step actuation. When the clamping system is in its fully open position, air pressure is supplied to a miniature pneumatic cylinder 121, in FIG. 17. The miniature pneumatic cylinder 121 extends the centering pin 136 into the substantially semi-cylindrical clamping zone formed by the bottom clamping jaws. The function of the centering pin 136 is similar to that of the centering pin 41 in the first embodiment. When the first piece of the weldable material is fully extended into the bottom clamping jaw 102, the terminus of the weldable material abuts against the centering pin 136 which is in the same spatial plane formed by the plurality of welding electrodes 130. At the first actuated position of the pneumatic cylinder 114, the top clamping jaw 103, biased by the spring rod 105, is advanced to its lock position, securely locks the fist piece of a weldable material between the top clamping jaw 103 and the bottom clamping jaw 102. At the second actuated position of the pneumatic cylinder 114, the centering pin 136 is fully extracted from the clamping zone, ready to receive the second piece of the weldable material. At the third actuated position of the pneumatic cylinder, the top clamping jaw 104 is biased by the linkage assembly of 109, 118, 117, 116, and 115 to its lock position, thus securely clamps the second piece of weldable material that is abutted against the first piece of weldable material.

When both pieces of weldable material are securely clamped by the clamping jaws 102, 103, 101, and 104, two plunger type electrical switches 105 in FIG. 18, located in the top clamping jaws 103 and 104 are activated. The activation of the switches signal the presence of the weldable material and the readiness for the commence of welding operation.

Figure 19A:
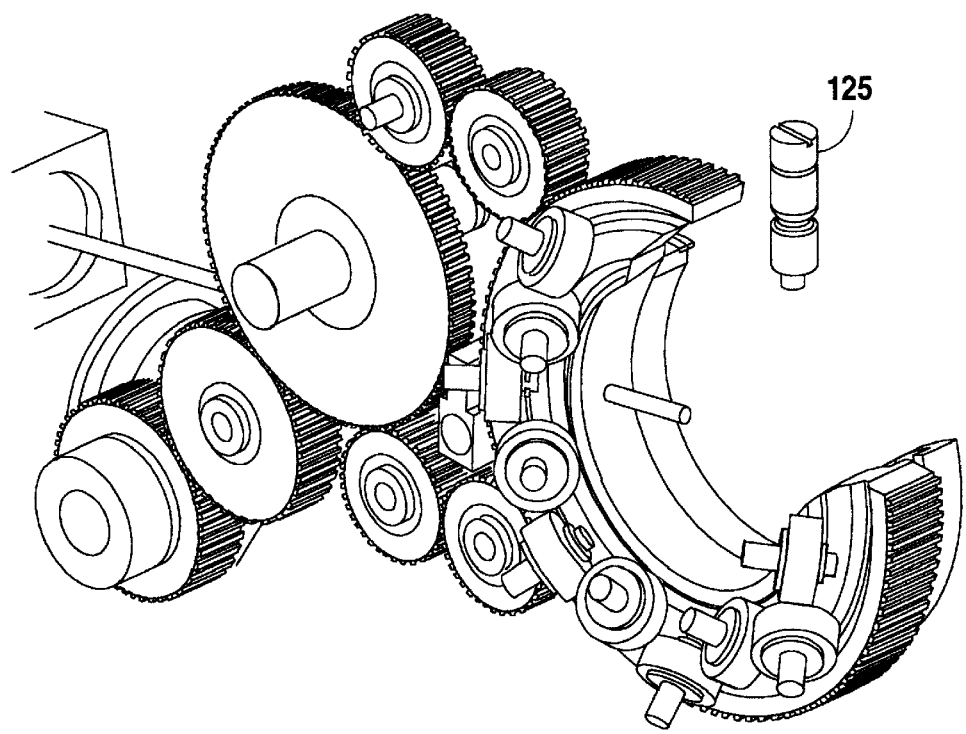
Figure 19B:
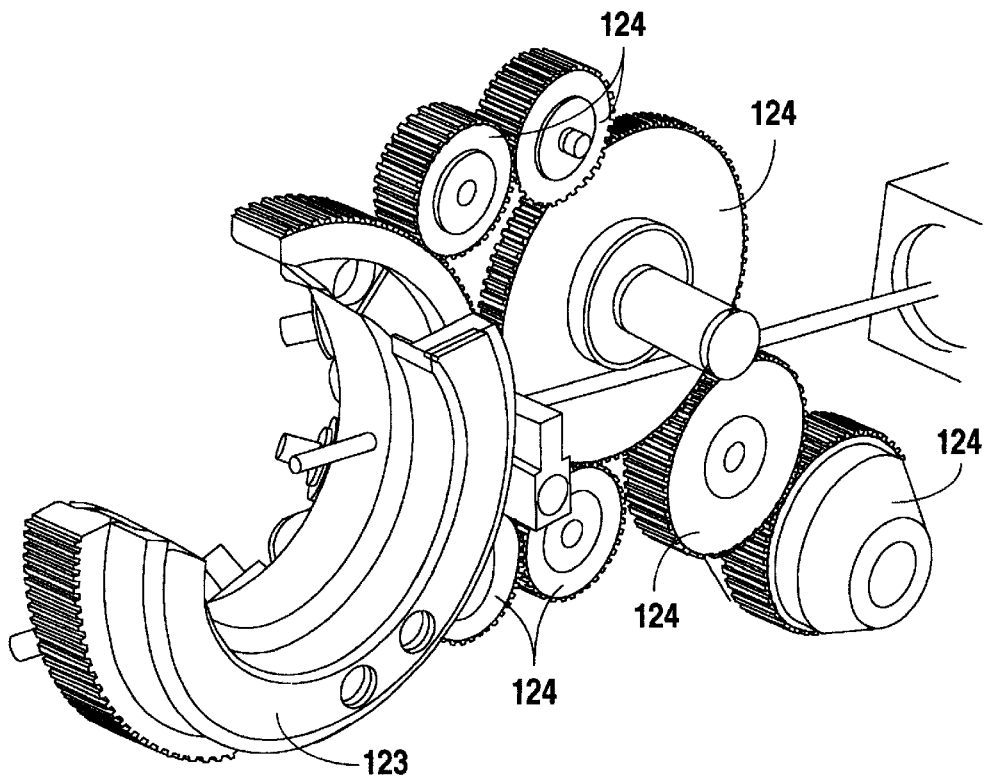

The welding operation involves both the rotation of the ceramic weld gear 129 and the flow of electrical current to the weld electrodes 130 in FIG. 18 and FIG. 19.

The ceramic weld gear 129 is driven by a electric motor 112, as shown in FIG. 20, through a drive gear assembly 124, as shown in FIG. 19. The drive motor system is comprised of an electric motor 112, a mounting bracket 111, a universal 110 which is used to correct for any misalignment between the motor 112 and the drive shaft 108 which is coupled to the drive gear assembly 124, as shown in FIG. 19. The rotation of the motor is further measured by an encoder 113 that provides control mechanism.

The alignment of the ceramic weld gear to the junction of the two pieces of weldable material is further enhanced by resting the ceramic weld gear on a bed of bearings 132 pressed onto the bottom clamping jaw 101, as shown in FIG. 18. The bearings 132 are arranged in an alternating 45 degree circular pattern. Each bearing 132 is secured onto the bearing pin 134 by a washer element 131 on the one side and a washer element 133 on the other side such that the inner race of the bearing is resting while the outer race can rotate.

The versatility of the alignment/weld device is further enhanced by incorporating collet inserts 135, as in FIG. 21, onto the clamping jaws 101, 102, 103, and 104, as shown in FIG. 21. By selecting collet inserts of different inner dimensions, the alignment/weld device will be easily adopted to welding material of different circumferences.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An apparatus for precision alignment and welding a first piece of weldable conduit to a second piece of weldable conduit, comprising:

a high precision alignment device comprising first jaw means forming a first portion of an alignment conduit adapted to operationally secure said first piece of weldable conduit in a fixed position within a first section of said alignment conduit;

a second jaw means forming a second portion of an alignment conduit adapted to operationally secure said second piece of weldable conduit in a fixed position within a second section of said alignment conduit;

said first and said second jaw means being configured and positioned whereby when a first terminus of said second piece of weldable conduit is inserted into said alignment device, as held in place by said second jaw means, and substantially abuts against a first terminus of said first piece of weldable conduit when said first piece of weldable conduit is fully inserted into said alignment device and held in place by said first jaw means, said first and said second pieces of weldable conduit form an abutment junction whereby said pieces of weldable conduit are aligned for being welding into a substantially unitary continuum;

a semi-circular, rotatable welding gear rotatably supported within said alignment conduit, said semi-circular, rotatable welding gear defining a central lumen sized and shaped for receiving said termini of said first and second pieces of weldable conduit therethrough and, said semi-circular, rotatable welding gear having a welding electrode extending therethrough into said lumen for contacting with said first and second pieces of weldable conduit for effecting a welding operation, said semi-circular, rotatable welding gear being supported by bearing means which include a plurality of alternatingly oriented roller bearings for effecting a self-centering and alignment of said semi-circular, rotatable welding gear.

* * * * *